United States Patent [19]
Birkner et al.

[11] Patent Number: 4,727,512
[45] Date of Patent: Feb. 23, 1988

[54] INTERFACE ADAPTOR EMULATING MAGNETIC TAPE DRIVE

[75] Inventors: David A. Birkner, Wellesley; Mark A. Sankey, Lexington, both of Mass.

[73] Assignee: Computer Design & Applications, Inc., Waltham, Mass.

[21] Appl. No.: 678,650

[22] Filed: Dec. 6, 1984

[51] Int. Cl.⁴ ............................................. G06F 3/04
[52] U.S. Cl. ................................................. 364/900
[58] Field of Search ........ 364/200, 900, 200 MS File, 364/900 MS File

[56] References Cited
U.S. PATENT DOCUMENTS

| | | | |
|---|---|---|---|
| 3,290,654 | 12/1966 | Rettig et al. | 364/200 |
| 4,004,277 | 1/1977 | Garvil | 364/200 |
| 4,511,963 | 4/1985 | Kantner | 364/200 |

Primary Examiner—Raulfe B. Zache
Assistant Examiner—Michael J. Ure
Attorney, Agent, or Firm—David W. Gomes; Richard J. Birch

[57] ABSTRACT

A magnetic tape drive emulator provides interface compatibility between a computer system having an industry standard tape drive interface and a peripheral image acquisition processing system. The emulator receives signals that are normally applied to a magnetic tape drive system and converts them into data signals which are formatted for general access by the image acquisition processing system. In addition, the magnetic tape drive emulator converts signals generated by the peripheral processing system into data signals which are formatted for access by the computer system through the standard tape drive interface.

4 Claims, 3 Drawing Figures

① SOMETIMES PHYSICALLY LOCATED ON TAPE "DRIVE", SOMETIMES PART OF TAPE "COUPLER"

② MAY BE MORE THAN ONE "DRIVE" DAISY CHAINED

③ INDUSTRY STANDARD BUS

① SOMETIMES PHYSICALLY LOCATED ON TAPE "DRIVE", SOMETIMES PART OF TAPE "COUPLER"

② MAY BE MORE THAN ONE "DRIVE" DAISY CHAINED

③ INDUSTRY STANDARD BUS

INTERFACE ADAPTOR EMULATING MAGNETIC TAPE DRIVE

BACKGROUND OF THE INVENTION

1. Field of the Invention:

The present invention relates to interface devices and, more particularly, is directed toward a device which provides modality interface compatibility between a computer system having an industry standard magnetic tape drive interface and peripheral image acquisition processing system.

2. Description of the Prior Art:

Generally, manufacturers of computer systems provide interface units which are specifically designed to operate with their system. However, virtually every digital imaging modality and film digitizer available today has a vendor supplied magnetic tape drive as an existing peripheral unit, or as an available option, and standard software to transfer images and patient data to and from the tape drive. Although there is an industry standard tape drive interface, there is no industry standard interface through which data is made available for general access by peripheral processing systems.

SUMMARY OF THE INVENTION

It is an object of the present invention to provide a universal interface device which converts magnetic tape drive signals into suitably formatted data that is available for general access by peripheral processing systems using existing industry standard interfaces.

It is a further object of the present invention to provide a magnetic tape drive emulator which interconnects with an industry standard magnetic tape drive interface bus of a computer system and a host bus of a peripheral processing system for receiving and transmitting data signals. The emulator converts magnetic tape drive signals generated by the computer system and applied to the magnetic tape drive interface bus via the magnetic tape drive interface into data signals. The emulator formats the data signals in such a way that they are available for general access by the peripheral processing system. The emulator also converts signals generated by the processing system into data signals which are formatted for access by the computer system through the standard tape drive interface.

The magnetic tape drive emulator includes a buffer memory, a data interface and control logic. Data signals are converted to the appropriate format and transfered between an industry standard magnetic tape interface bus which is accessible by the computer system and a host interface bus which is accessible by the processing system via the tape emulator. Transfer of digital data to and from a databus is provided by the data interface which is connected to the buffer memory. A control logic which receives signals from the magnetic tape bus and the data bus via the data interface controls the operation of the magnetic tape drive emulator.

Other objects of the present invention will in part be obvious and will in part appear hereinafter.

The invention accordingly comprises the device, together with its parts, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
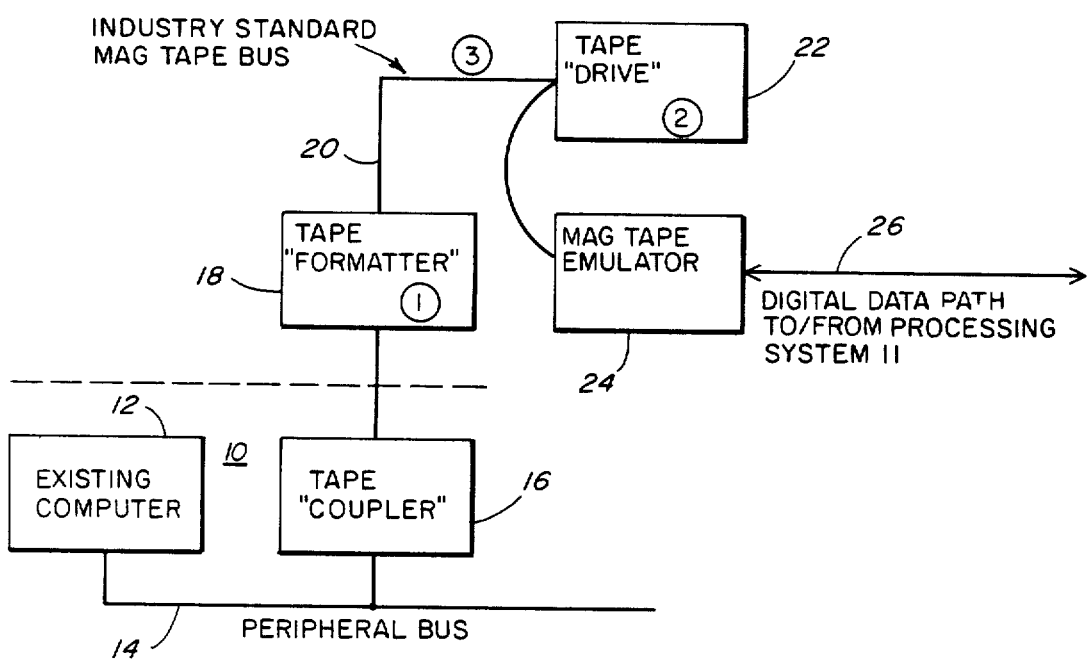
FIG. 1 is a block and schematic diagram of a computer system with a magnetic tape drive bus and a magnetic tape drive emulator embodying the present invention.

Referring now to the drawings, particularly FIG. 1, there is shown a block diagram of a computer system 10 which is provided with a magnetic tape drive emulator 24 embodying the present invention. Magnetic tape drive emulator 24 is an imaging interface between computer system 10 and a peripheral image processing system 11, for example, a picture archival and communications system. Computer system 10 has a computer 12 which is connected to a peripheral bus 14. A tape coupler 16 couples signals between the peripheral bus 14 and a tape formatter 18.

An industry standard magnetic tape drive interface bus 20 carries data between the tape formatter 18 and a tape drive system 22 which is a single magnetic tape drive unit or multiple magnetic tape drives which are daisy chained togehter. Manufacturers of computer systems provide a standard interface for interconnection with magnetic tape transport devices. This is evidenced by the fact that magnetic tape transport device manufactures, for example, Pertec Peripheral Equipment, Cipher, Kennedy, Fujitsu, CDC, IBM and Wang have conforming specifications with regard to signals passing between the tape formatter and the magnetic tape transport.

The magnetic tape drive emulator 24 embodying the present invention is connected to the magnetic tape drive interface bus 20. The magnetic tape drive emulator 24 receives the magnetic tape data and controls signals at the magnetic tape drive interface bus 20 and converts them into digital data and control signals. The digital data and control signals are sent to a data bus 26 where they are available for general access. That is, magnetic tape drive emulator 24 emulates the operation of tape drive 22 and interface bus 20, and converts the tape drive signals into a suitable format that is accessible by the peripheral image acquisition processing system 11. Also, data and control signals generated by the peripheral processing system 11 are converted in the magnetic tape drive emulator 24 into data and control signals which are formatted for access by the computer system 10.

Figure 2:
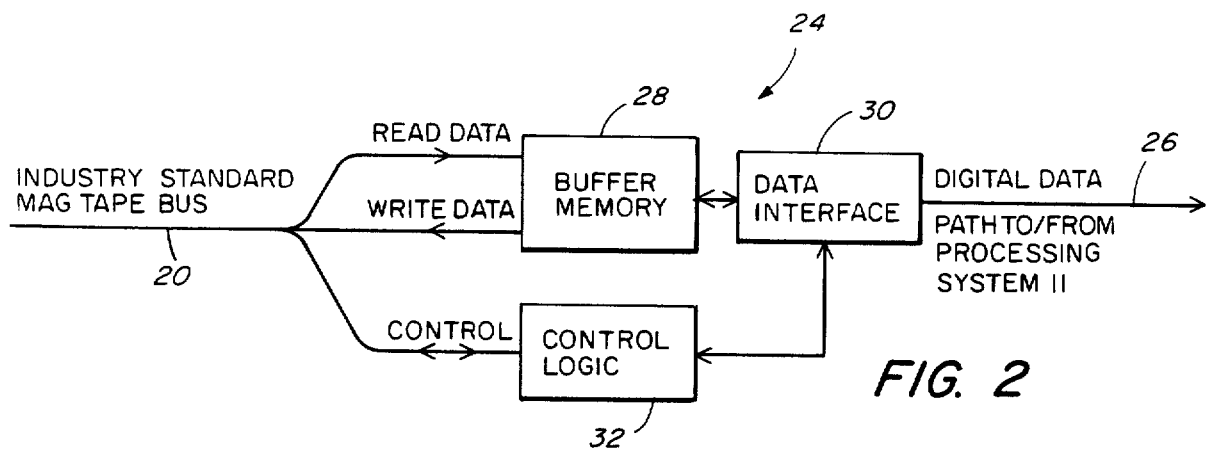
FIG. 2 is simplified block and schematic diagram of the magnetic tape drive emulator of FIG. 1.

As shown in FIG. 2, magnetic tape drive emulator drive 24 includes a buffer memory 28 to which write data from magnetic tape interface bus 20 is applied and from which read data is fed to the magnetic tape interface bus. Read and write data are fed between the buffer memory 28 and a data interface 30 which is connected to the data bus 26. Buffer memory 28 is provided to smooth the flow of data between the magnetic tape interface bus 20 and the data bus 26. A control logic 32, which receives signals from the magnetic tape interface bus 20 and the digital data bus 26 via data interface 30, controls the operation of magnetic tape drive emulator 24.

Figure 3:
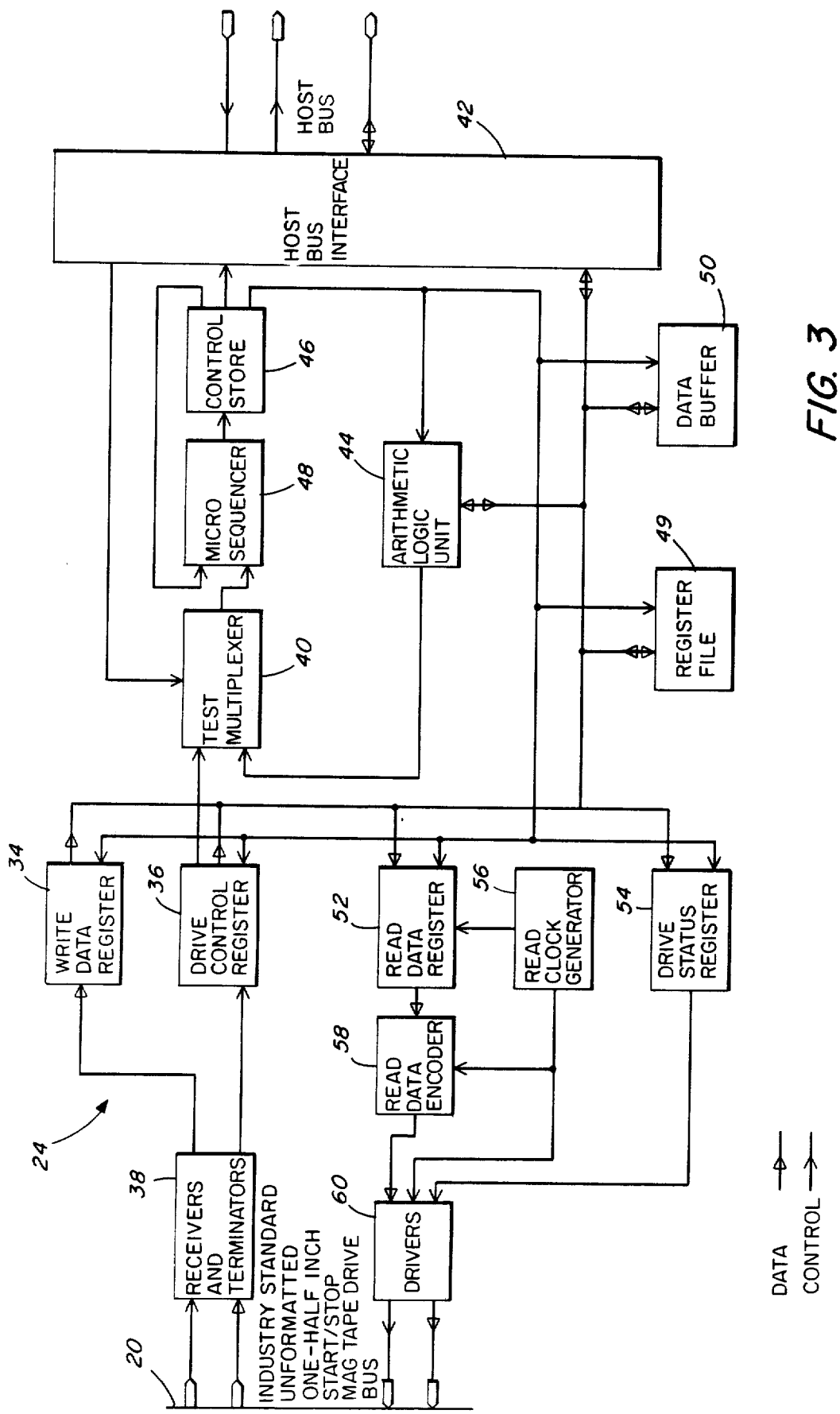
FIG. 3 is a detailed block and schematic diagram of the magnetic tape drive emulator of FIG. 1.

In the detailed schematic and block diagram of FIG. 3, control signals are denoted by the open arrow heads and data signals are denoted by the closed arrow heads. Data and control signals from magnetic tape interface bus 20 are applied respectively to a write data register 34 and a drive control register 36 via receivers and terminators 38. Control signals from drive control register 36 are fed to a test multiplexer 40 which receives input signals from the peripheral image processing system 11 via a host bus interface 42 and an arithmetic logic unit 44. Test multiplexer 40 output signals and a feedback signal from a control store unit 46 are applied to a micro sequencer 48, the output signals generated by the micro sequencer being fed to the control store unit 46. Control signals generated by the control store unit 46 are applied to the host bus interface 42. In addition, the control store unit 46 output control signals are fed to the arithmetic logic unit 44 as well as the units which receive data signals. Test multiplexer 40, micro sequencer 48, control store unit 46 and arithmetic logic unit 44 define a processing unit.

As previously indicated, write data signals from receivers and terminators 38 are sent to the write data register 34. The write data signals are stored in a register file 49 and fed to the host bus interface 42 via a data buffer 50. The write data signals are converted in arithmetic logic unit 44 into a predetermined format which is suitable for access by the peripheral processing system 11 via the host bus interface 42.

Read signals from the peripheral processing system 11 are applied to magnetic tape drive emulator 24 via the host bus interface 42. The read signals are sent to a read data register 52 and a drive status register 54 via data buffer 50 and register file 49. Read data register 52, in response to control signals from control store 46 and clock signals from a read clock generator 56 processes the received read data signals. The processed read data signals are encoded in a read data encoder 58 and applied to the magnetic tape interface bus 20 via drivers 60. The drive status register 54 controls the application of the encoded read data signals to the magnetic tape interface bus 20 as a function of the status of the signals on the bus.

Since certain changes may be made in the foregoing disclosure without departing from the scope of the invention herein involved, it is intended that all matter contained in the above description and depicted in the accompanying drawings be construed in an illustrative and not a limiting sense.

What is claimed is:

1. A magnetic tape drive emulator for use with a computer system having industry standard tape drive interface and peripheral image processing system, said magnetic tape drive emulator comprising:
   (A) receivers and terminators for receiving data signals and control signals present on an industry standard tape drive interface:
   (B) a write data register connected to said receivers and terminators for receiving said data signals;
   (C) a drive control register connected to said receivers and terminators for receiving said control signals; and
   (D) a processing unit connected to said write data register and said drive control register for converting said data signals into an image processing system signal format,
   wherein said processing unit includes:
   (a) a test multiplexer connected to said drive control register for receiving signals at the output thereof;
   (b) a micro sequencer connected to said test multiplexer for receiving signals at the output thereof;
   (c) a control store connected to said micro sequencer, a feedback signal generated by said control store applied to said micro sequencer; and
   (d) an arithmetic logic unit connected to said control store and said test multiplexer, write data signals generated by said write data register being applied to said arithmetic logic unit, said write data signals converted in said arithmetic logic unit into an image processing system format.

2. The magnetic tape drive emulator as claimed in claim 1 including:
   (a) a register file and data buffer for receiving said image processing system format data signals;
   (b) said arithmetic logic unit also converting image processing system data signals and control signals into computer system format;
   (c) a read data register for receiving said signals converted into said computer system format;
   (d) a read data encoder connected to said read data register for encoding data signals generated by said read data register; and
   (e) driver means connected to said read data encoder and for presenting said computer system format data signals to the standard tape drive interface.

3. The magnetic tape drive emulator as claimed in claim 2 including a drive status register for receiving signals representing the status of the computer system and controlling said driver means as a function of said status.

4. A magnetic tape drive emulator for use with a computer system having an industry standard tape drive interface and peripheral image processing system, said magnetic tape drive emulator comprising:
   (a) receivers and terminators for receiving data and control signals presented on an industry standard tape drive interface;
   (b) a write data register connected to said receivers and terminators for receiving said data signals;
   (c) a drive control register connected to said receivers and terminators for receiving said control signals;
   (d) a test multiplexer connected to said drive control register for receiving signals at the output thereof;
   (e) a micro sequencer connected to said test multiplexer for receiving signals at the output thereof;
   (f) a control store connected to said micro sequencer, a feedback signal generated by said control store applied to said micro sequencer;
   (g) an arithmetic logic unit connected to said control store and said test multiplexer, write data signals generated by said write data register being applied to said arithmetic logic unit, said write data signals converted in said arithmetic logic unit into an image processing system format;
   (h) a register file and data buffer for receiving said image processing system format data signals;
   (i) said arithmetic logic unit also converting image processing system data signals and control signals into computer system format;
   (j) a read data register for receiving said signals converted into said computer system format;
   (k) a read clock generator connected to said read data register for controlling the operation thereof;

(l) a read data encoder connected to said read data register and read clock generator for encoding data signals generated by said read data register;

(m) a drive status register for receiving signals representing the status of the computer system; and (n) driver means connected to said read data encoder and said drive status register for presenting said computer system format data signals to the standard tape drive interface when said computer system is available to receive said computer system format data signals.

* * * * *